Dec. 4, 1951          A. H. DICKINSON          2,577,074
                        MULTIVIBRATOR
Filed Jan. 18, 1949                        10 Sheets-Sheet 1
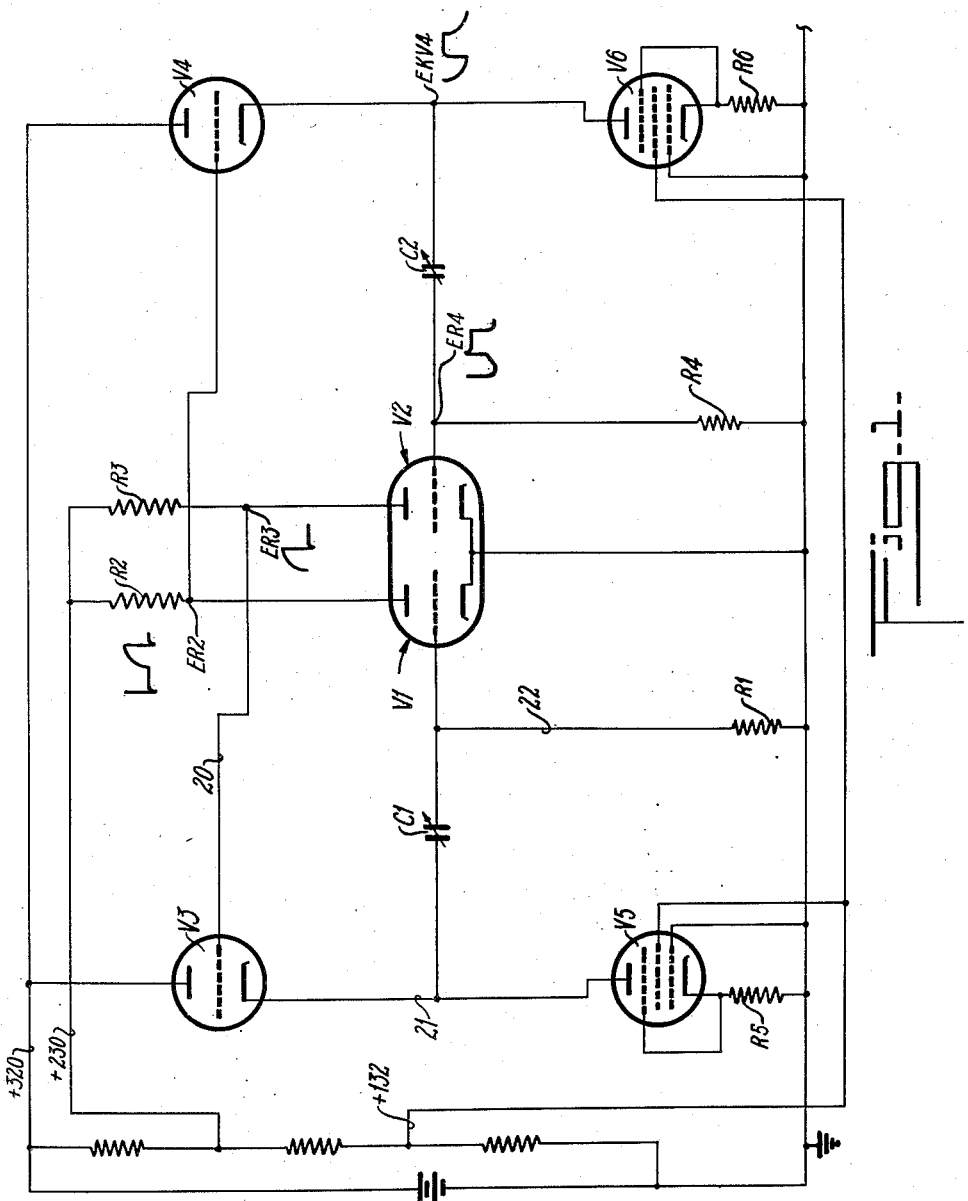
INVENTOR
ARTHUR H. DICKINSON
BY
ATTORNEY

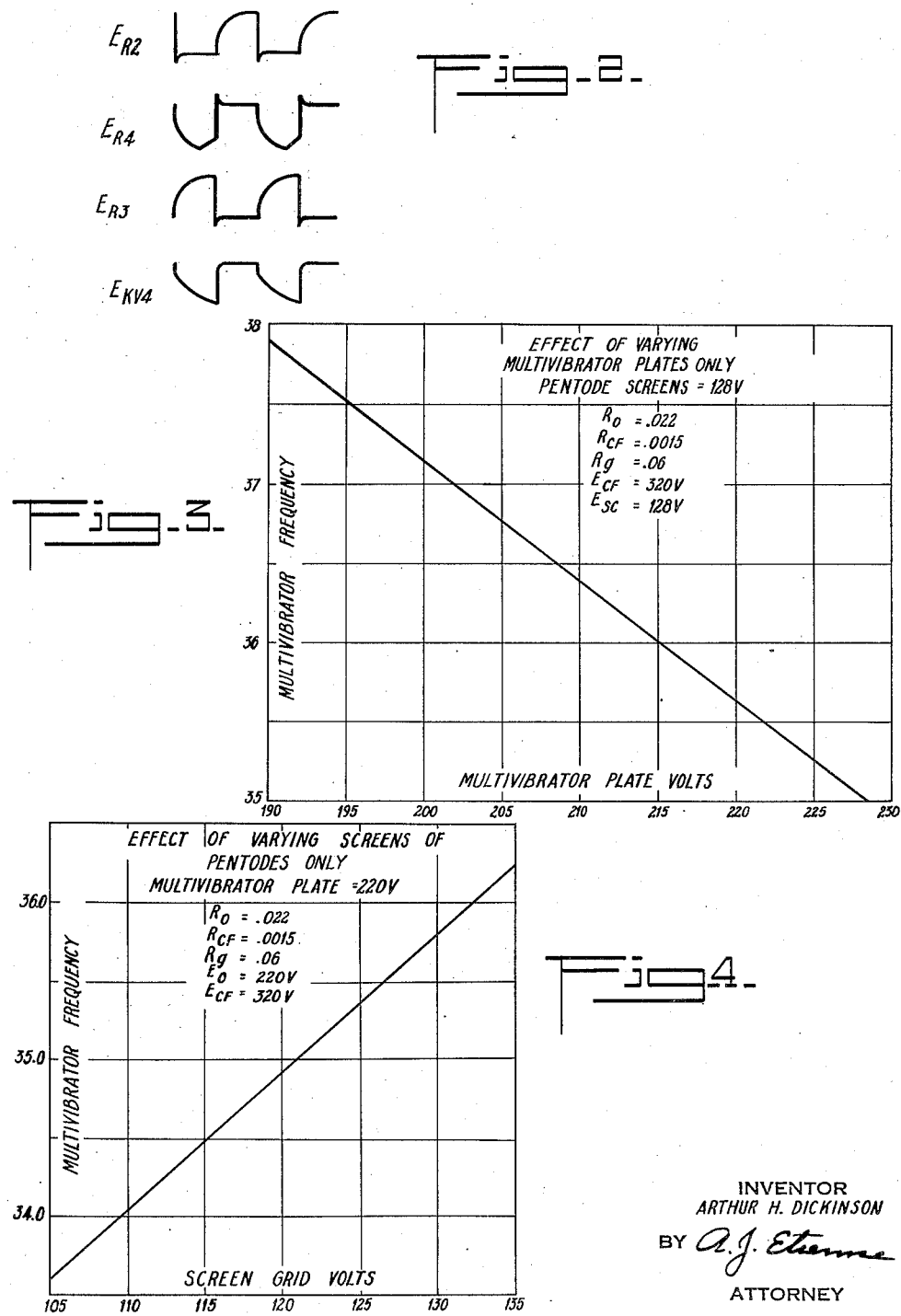

Dec. 4, 1951  A. H. DICKINSON  2,577,074
MULTIVIBRATOR
Filed Jan. 18, 1949  10 Sheets-Sheet 3

Eo – MULTIVIBRATOR PLATE SUPPLY VOLTAGE

INVENTOR
ARTHUR H. DICKINSON
BY A. J. Etienne
ATTORNEY

Dec. 4, 1951   A. H. DICKINSON   2,577,074
MULTIVIBRATOR
Filed Jan. 18, 1949   10 Sheets-Sheet 4

INVENTOR
ARTHUR H. DICKINSON
BY *A. J. Etienne*
ATTORNEY

Dec. 4, 1951 A. H. DICKINSON 2,577,074
MULTIVIBRATOR
Filed Jan. 18, 1949 10 Sheets-Sheet 6

INVENTOR
ARTHUR H. DICKINSON
BY
ATTORNEY

Dec. 4, 1951  A. H. DICKINSON  2,577,074
MULTIVIBRATOR
Filed Jan. 18, 1949  10 Sheets-Sheet 8
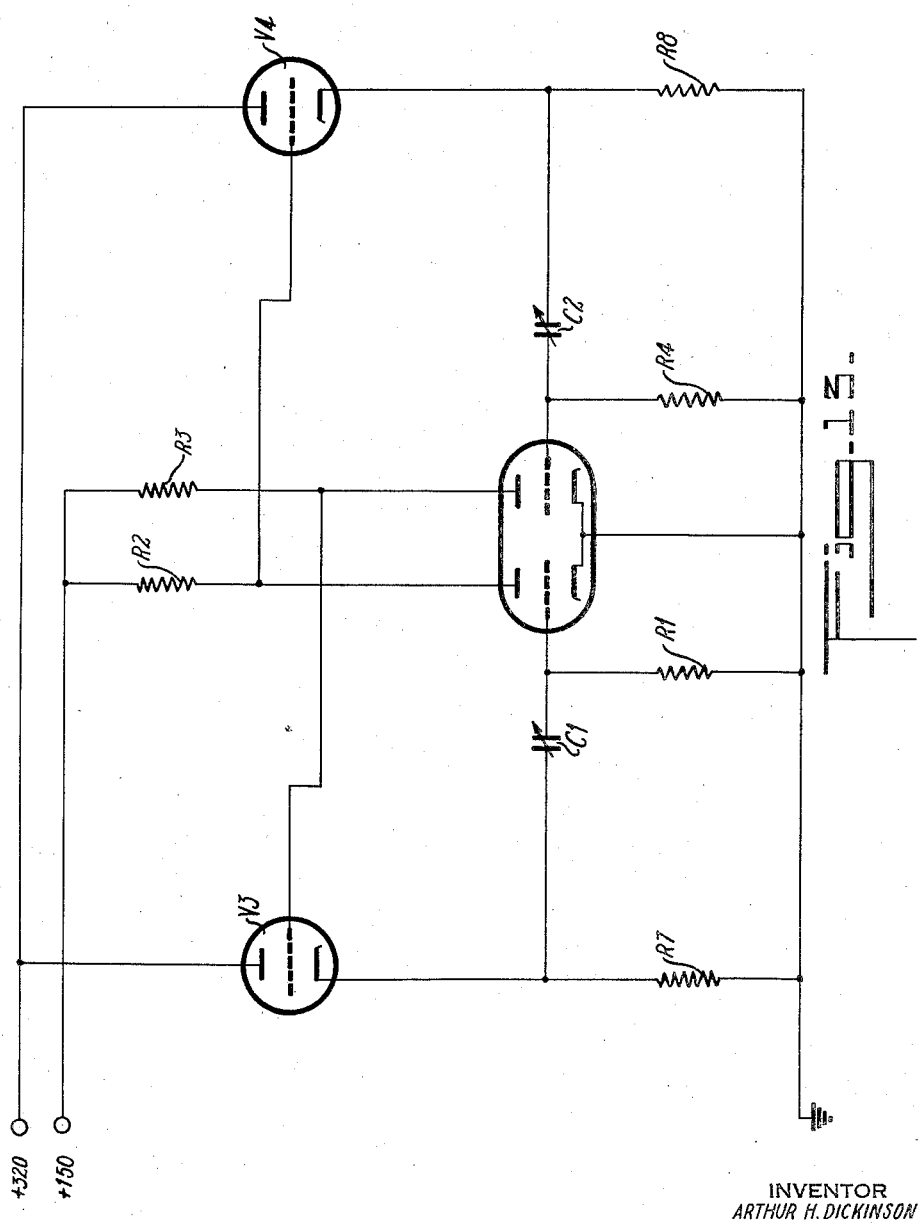
INVENTOR
*ARTHUR H. DICKINSON*
BY *A. J. Etienne*
ATTORNEY

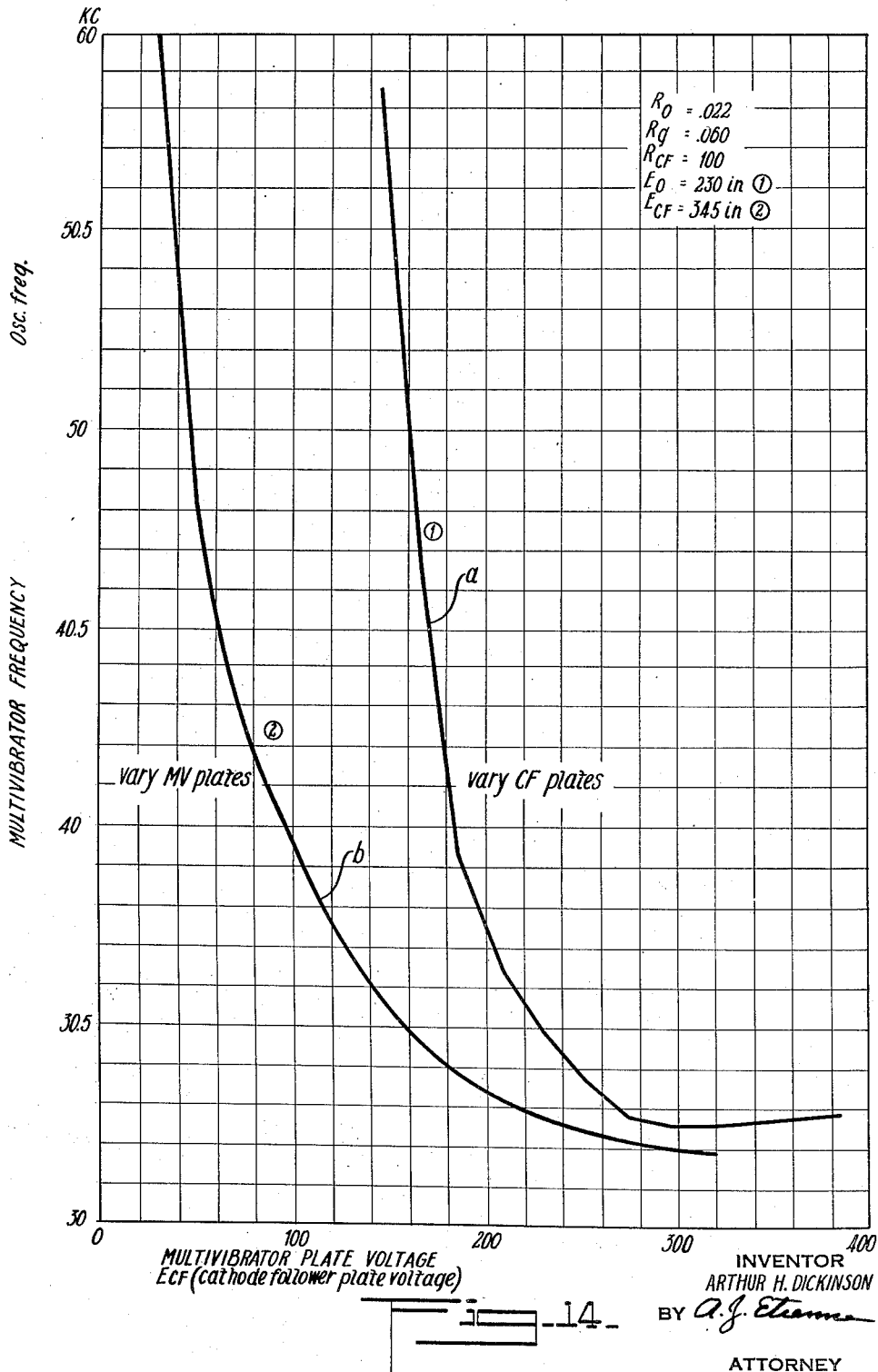

Dec. 4, 1951 A. H. DICKINSON 2,577,074
MULTIVIBRATOR
Filed Jan. 18, 1949 10 Sheets-Sheet 10
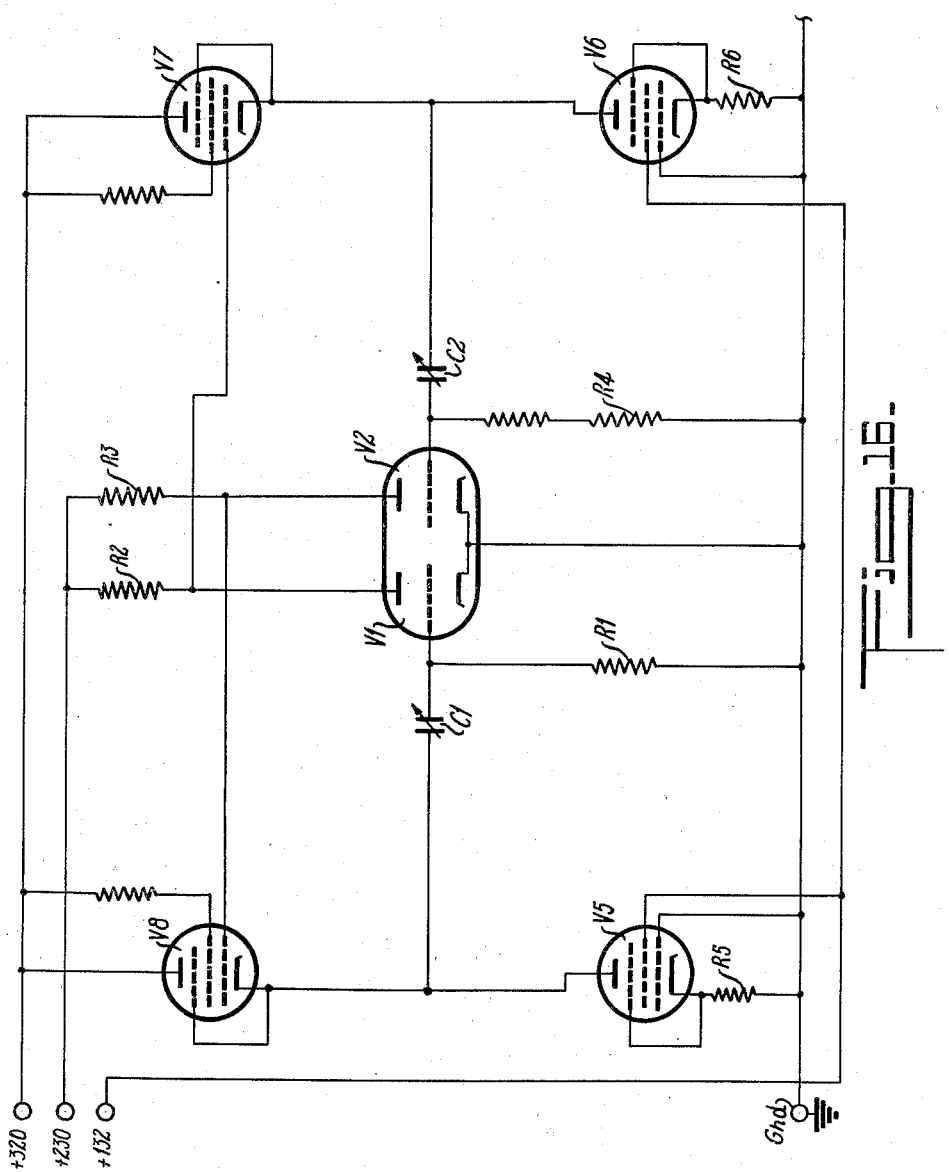
INVENTOR
ARTHUR H. DICKINSON
BY *A. J. Etienne*
ATTORNEY Patented Dec. 4, 1951

2,577,074

UNITED STATES PATENT OFFICE 2,577,074

MULTIVIBRATOR

Arthur H. Dickinson, Greenwich, Conn., assignor to International Business Machines Corporation, New York, N. Y., a corporation of New York Application January 18, 1949, Serial No. 71,482

5 Claims. (Cl. 250—36)

1

This invention pertains to the frequency stabilization of an oscillator which is in the form of tubes cross coupled by cathode follower circuits to form a multivibrator.

The principal object of the invention is to provide frequency stabilization in a multivibrator.

Another object is to employ novel means to eliminate the effect of variations in the anode voltage upon the frequency of an oscillator.

Still another object is to cancel the effect of variations of heater supply voltage upon the frequency of an oscillator circuit by opposing the variations produced in the several elements of the oscillator circuit.

A further object is to provide novel means to compensate for variations of the frequency of an oscillator.

Another object is to provide a multivibrator comprising a two stage resistance-capacity coupled amplifier operatively associated in a novel manner with a buffer network, so as to considerably improve the frequency stability thereof.

Another object is to provide a multivibrator comprising a two stage amplifier wherein the plate of each tube is decoupled from the grid of the other tube by novel means.

A still further object is to provide a very stable multivibrator having a buffer network between the output of each stage and the input to the other stage which comprises a cathode follower in which a self-biased pentode serves as a cathode resistor.

An example of a particular type of electrical system to which the various embodiments of my invention may be applied is an electronic counting system, for whose operation a highly stabilized multivibrator, as a source of accurately timed pulses, is employed.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a circuit diagram of the main embodiment of my invention.

Fig. 2 is a diagrammatic representation of the successive voltage changes occurring in the circuit of Fig. 1.

Fig. 3 is a curve illustrating the effects produced on the frequency of the improved multivibrator by controllably varying the plate supply voltage of the amplifier tubes only.

Fig. 4 is a curve illustrating the effect produced on the frequency of the improved multivibrator employing pentodes by controllably varying the screen grid voltage of the pentodes only.

Figure 6:
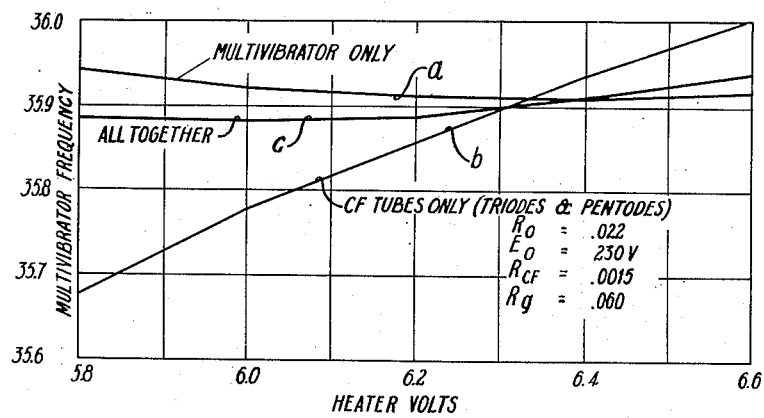

Fig. 6 comprises a series of curves illustrating the effect produced on the frequency of the improved multivibrator employing two sets of tubes by varying the heater voltage on one set, by varying the heater voltage on the other set and by varying the heater voltage on both sets.

Figure 7:
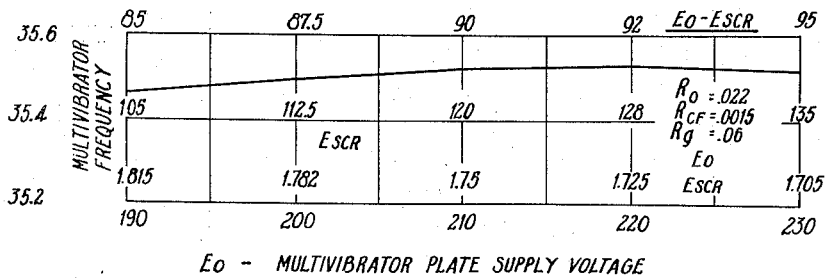

Fig. 7 is a curve illustrating at an increased scale, the effect produced on the frequency of the improved multivibrator by simultaneously varying the plate supply voltage of the amplifier tubes and the screen grid voltage of the pentodes.

Figure 8:
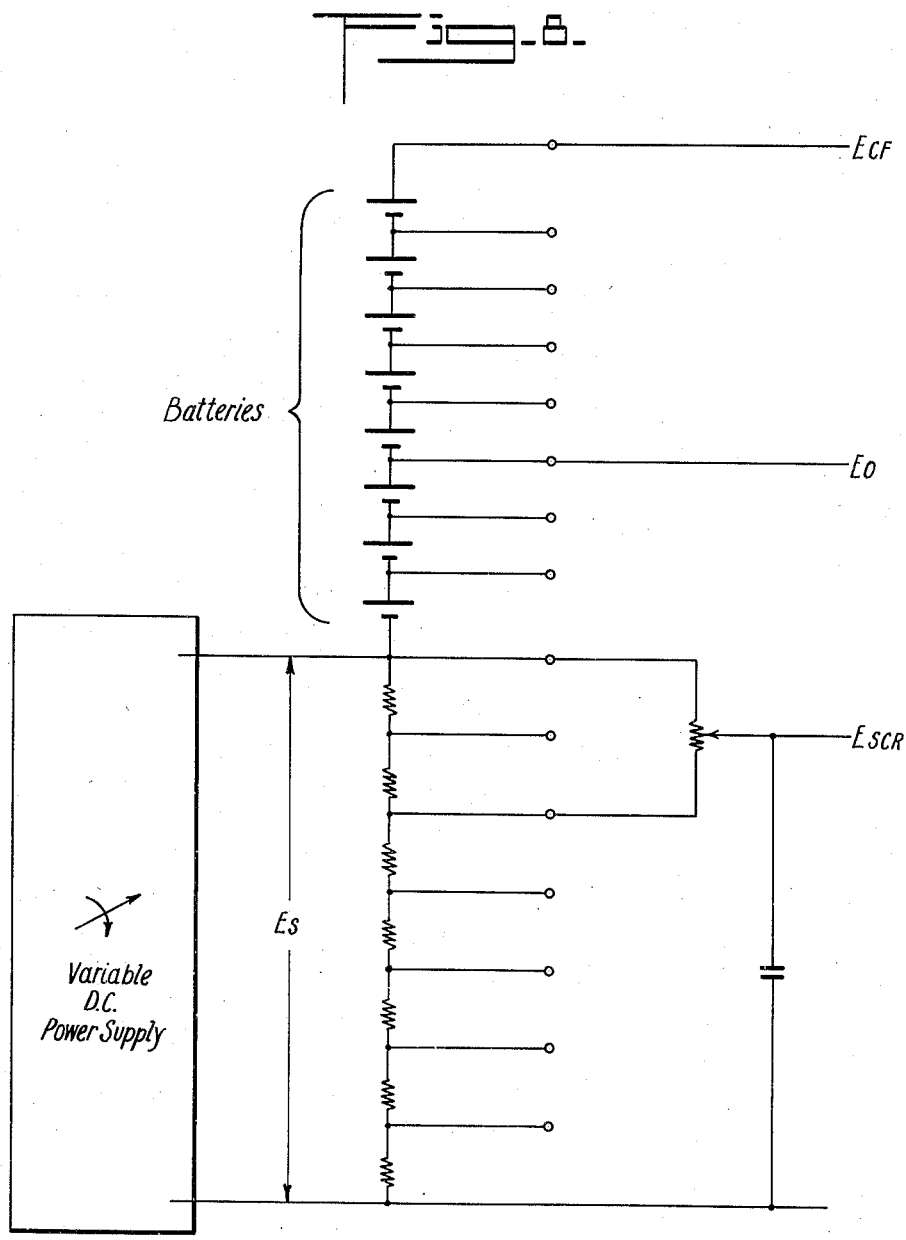

Fig. 8 is a diagrammatic representation of the power supply source used with my invention.

Figure 9:
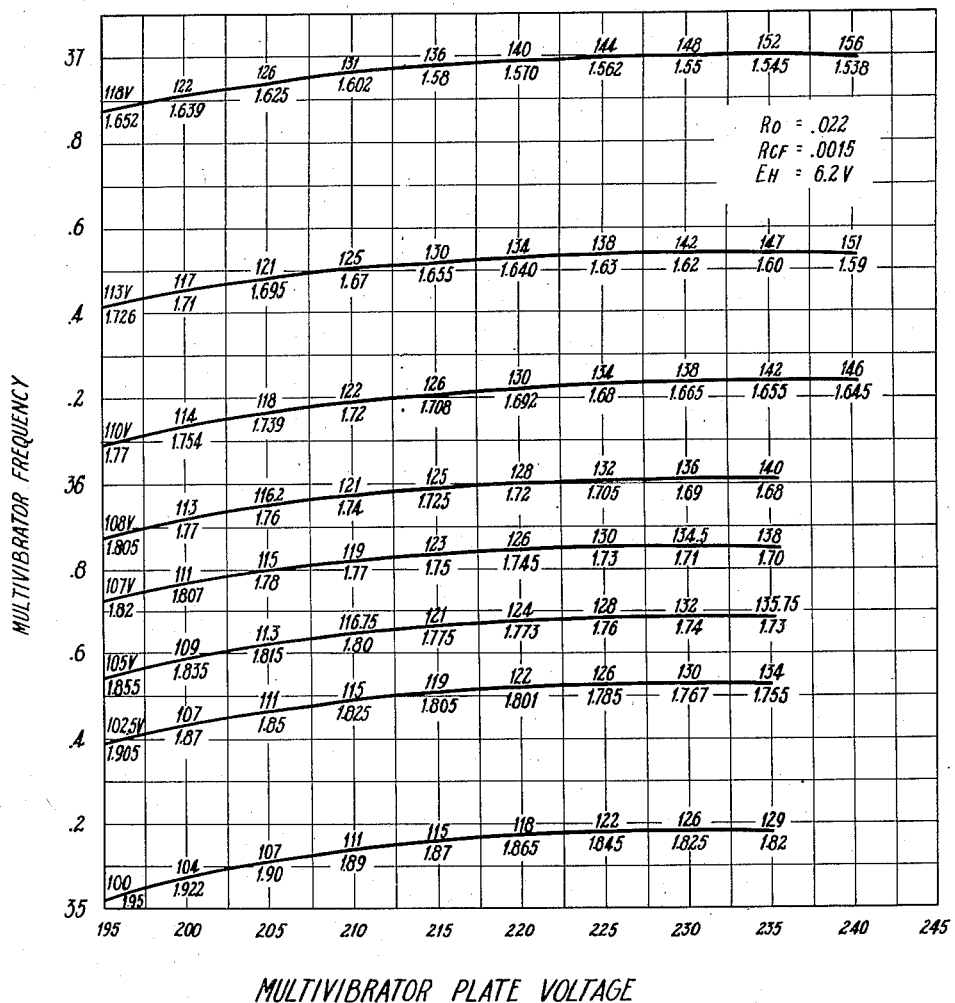

Fig. 9 is a series of curves of the type of Fig. 7.

Figure 10:
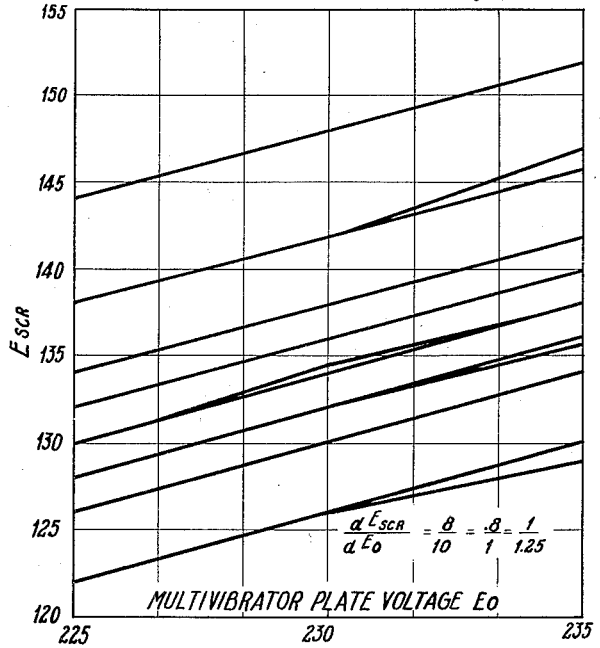

Fig. 10 is a series of curves derived from Fig. 9 illustrating the relationship between values of screen voltage and plate supply voltage as they were simultaneously varied, depicting graphically that the ratio of increase of the screen grid voltage to the increase of plate voltage is a constant over the stable range of the curves of Fig. 9.

Figure 11:
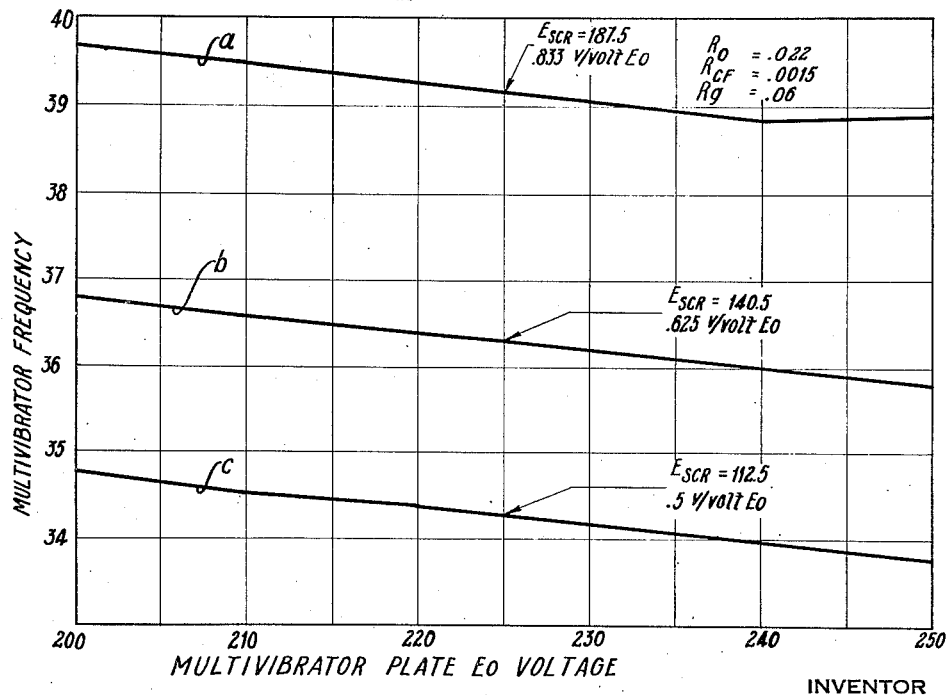

Fig. 11 is a series of curves illustrating the relationship between frequency and plate supply voltage to the amplifier tubes for different rates of change of screen grid voltage with respect to plate voltage and different initial values of $E_{SCR}$.

Figure 12:
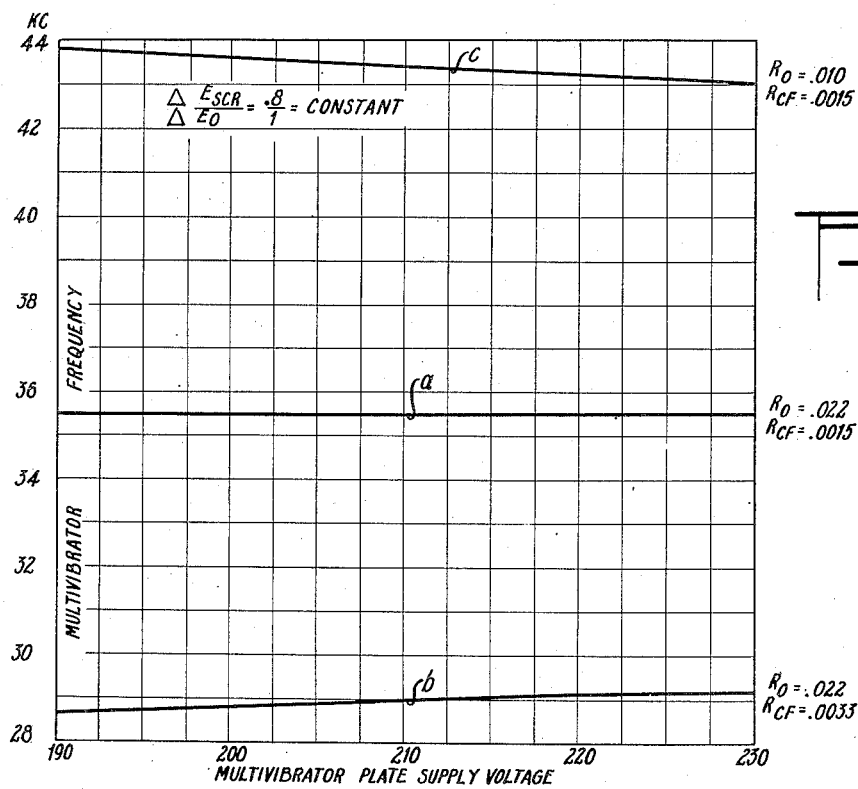

Fig. 12 are curves illustrating the relationship between the multivibrator frequency and plate supply voltage to the amplifier tubes for several different values of pentode self biasing and load resistance.

Fig. 13 is a circuit diagram of a simplified version of the device of Fig. 1.

Fig. 14 are curves illustrating the effect upon the frequency of the multivibrator of Fig. 13 when the plate voltage of either the cathode follower or the multivibrator is varied.

Figure 15:
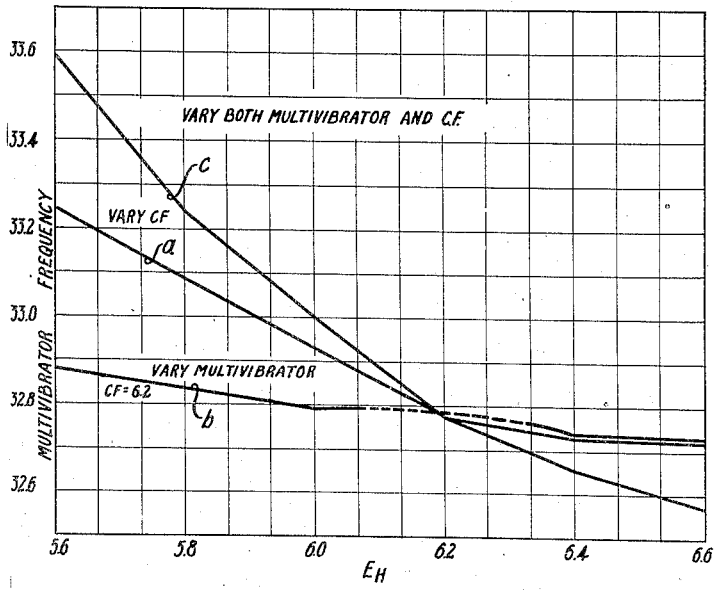

Fig. 15 are curves illustrating the effect upon the frequency of the multivibrator of Fig. 13 when the heater voltages are varied.

Fig. 16 is a wiring diagram of another modification of the device of Fig. 1.

Studies made of the conventional multivibrator have shown conclusively that small variations in plate and heater voltages materially affect the frequency of oscillation, and that it is possible, by properly adjusting the nominal value of these voltages and the values of the resistors and condensers used, to improve the frequency stability without having to improve the regulation of the power supplies. But, since it is fair to consider a multivibrator as a two-stage resistance-capacitance coupled amplifier, then each stage of the multivibrator consists of only one vacuum tube and it becomes apparent that the relation of input to output can never be kept constant, in the standard multivibrator, as the supply voltages are varied, and hence a limit in the improvement in frequency stability is to be expected.

To improve the frequency stability beyond this limit novel means are employed comprising a vacuum tube type buffer network introduced into each stage in a novel manner and, being fundamentally a cathode follower circuit this circuit introduces attenuation rather than amplification, and serves as a compensating network, so that the relation of input to output of each stage is relatively unaffected by variations in supply voltages. The amplifier stages of the multivibrator of this invention are not capacitively loaded, as is the conventional multivibrator because of the use of the cathode followers, which are connected in a novel manner to decouple the plate of one tube from the grid of the other tube.

Referring to Fig. 1, the amplifier tubes of the improved multivibrator are illustrated as a duo-triode of the 6N7 type but it is apparent that it could also comprise two separate triodes. This multivibrator may be considered as a two-stage resistance-capacity coupled amplifier comprising two vacuum tubes V1 and V2 (shown respectively as halves of a duo-triode) each of which includes a cathode, a control grid and an anode. The cathodes are connected together and to ground through a common lead. The anodes of V1 and V2 are connected to a plus 230 volt tap of a common voltage source through 0.022 megohm resistances R2 and R3, respectively. The control grid of V1 is connected to ground through a 0.060 megohm grid-leak resistor R1 and the control grid of V2 is similarly connected to ground through a 0.060 megohm grid-leak resistor R4. The anode of each of the stages controls the input signal to the grid of the other stage by means of a novel buffer network, which shall be described subsequently, and by means of a 100 micromicrofarad variable condenser, such as C1 connected to the control grid of V1 or C2 connected to the control grid of V2.

One buffer network comprises a cathode follower triode V3 of the type 6SN7 employing a self-biased pentode V5 of the type 6SJ7 as a cathode resistor element and is employed in coupling the plate of V2 to the grid of V1 while triode V4 and pentode V6 similarly couple the plate of V1 and the grid of V2.

The anode of the tube V2 is directly connected by a conductor 20 to the grid of the cathode follower V3 whose anode is connected to a plus 320 volt tap of the common voltage source. The cathode of triode V3 is connected by a conductor 21 to the anode of the pentode V5 whose cathode is connected to ground through the self biasing 0.0015 megohm resistor R5. The control grid of this pentode is also connected directly to ground while the screen grid is connected to a plus 132 volt tap on the common voltage source. The variable capacitor C1 is connected at one side to the line 21 and at the other side to the control grid of V1 which is grounded by means of a conductor 22 and a resistor R1 of 0.06 megohm. The cathode follower circuit from the anode of V1 to the control grid of V2 will not be described since such is identical to the circuit just described.

The operation of the device of Fig. 1 may be best understood by referring to Fig. 2. The normal bias of tubes V1 and V2 is zero. The triodes V3 and V4 are continuously conducting, as are the self biasing pentodes V5 and V6. The plate currents of V5 and V6 are substantially constant and equal. The network is unstable and oscillations are initiated by incipient electrical disturbances, as soon as the tube heaters are at operating temperature. Once started, the operation of the circuit can be visualized as a see-saw, since first one tube, for example V1, and then V2, conducts in succession. Either oscillator tube shifts from a conducting to a non-conducting status, and vice-versa, substantially instantaneously because of the cumulative, regenerative action of the circuit.

Illustrative of such action is V1 suddenly starting to conduct, thereby reducing its plate voltage so that the voltage at point ER2 drops suddenly as seen for time A in Fig. 2. This reduced voltage is applied conductively to the grid of V4 and causes the cathode potential of cathode follower triode V4 to fall in value, and, as a result, condenser C2 applies a voltage to the grid of V2 of a polarity and value such that the grid of multivibrator tube V2 is suddenly carried beyond the cut-off value (See voltage for point ER4, Fig. 2, when ER2 drops) rendering it non-conductive. The resultant sudden rise in plate voltage of V2 and at point ER3 (Fig. 2) is applied as an increased voltage to the grid of V3 and causes the cathode potential of cathode follower tube V3 to rise in value, so that condenser C1 charges through triode V3 and resistor R1 thus aiding the shift of the multivibrator tube V1 to its fully conducting condition.

Upon reaching its maximum negative value, the grid voltage of multivibrator tube V2 immediately starts to decrease, inasmuch as the charge on condenser C2 immediately starts to leak off through resistors R4 and R6 and the pentode V6. This produces a gradually decreasing current flow through resistor R4 and the negative grid voltage of V2, as determined by resistor R4, eventually arrives at the cut-off value for V2, at which instant the tube starts to conduct, shifting the multivibrator tube V1 to shut-off and the circuit to its reverse status. The resultant negative charge on condenser C1 then leaks off, V1 eventually conducts and V2 is cut off. Such oscillations or see-sawing actions occur at a rate principally defined by the following equation:

$$1/f = (R1 + R5 + r_p[V5])C1 + (R4 + R6 + r_p[V6])C2$$

where $r_p$ (V5) is the A.-C. plate resistance of the pentode V5 $r_p$ (V6) is the A.-C. plate resistance of the pentode V3 and R1, R4, R5 and R6 and C1 and C2 have the values as set forth above for the device of Fig. 1. The multivibrator, in addition to producing square waves, from which differentiating circuits may derive peaked pulses having a steep wave front, is also a source of saw-tooth pulses. Such pulses appear on the cathodes of the buffer input triodes V3 and V4 but they are each only one-half cycle in duration, as shown, for example, for point EKV4 in Fig. 2.

As stated above, there exists a definite limit in the improvement in frequency stability of a standard multivibrator, which limit is now overcome by employing the novel vacuum type buffer of the invention which is introduced, as described in detail above, into each stage of the multivibrator. That this novel arrangement possesses the inherent characteristics necessary to provide frequency compensation is shown in detail by a study of Figs. 3 to 7.

Referring to Fig. 3 in which the plate voltage, as the abscissa, is plotted against the multivibrator frequency as the ordinate, it is seen that when the plate supply of the multivibrator is varied, with the screen grid voltage of the buffer network being maintained constant, the frequency decreases, as the multivibrator plate voltage increases. Referring to Fig. 4 whose curve represents the screen grid voltage as the abscissa plotted against the multivibrator frequency as the ordinate, it is seen that when the screen grid voltage of the buffer network was varied, with the multivibrator plate supply voltage being maintained constant, the frequency increases, as the voltage increases. A comparison of Figs. 3 and 4 indicates clearly that simultaneously increasing the plate supply voltage of the multivibrator plates and of the screen grid will produce equal and opposite variations of multivibrator frequency thus cancelling out frequency variations due to changes in voltage. There is thus provided in the novel circuit of Fig. 1, highly efficient means for eliminating frequency changes in a multivibrator due to changes in plate supply voltages.

Figure 5:
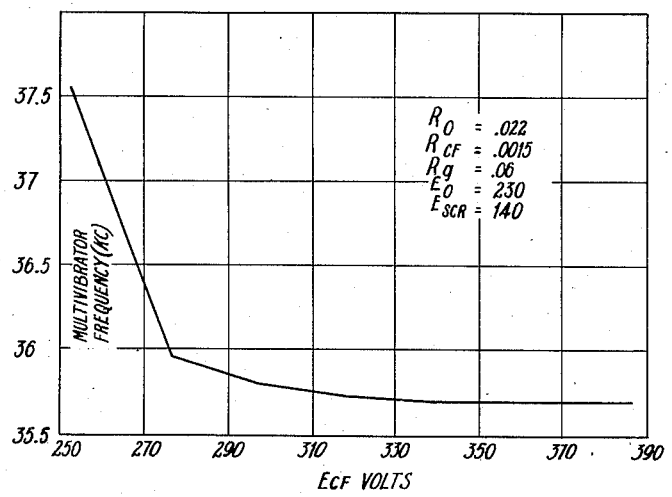
Fig. 5 is a curve illustrating the relationship between the frequency of the improved multivibrator and the supply voltage to the buffer circuit employed.

Referring to Fig. 5, it is seen that variations in the plate supply of the buffer network, within a range of buffer plate supply voltage high enough to prevent grid current, all other voltages being maintained constant produce no frequency variation.

Referring to Fig. 6, in which heater voltage as the abscissa is plotted against the multivibrator frequency, as the ordinate, it is seen from curve $a$ that when the heater voltage of the amplifier tubes only is varied (the heater voltage of the tubes in the buffer network being maintained constant) the frequency of the multivibrator decreases as the voltage increases but it is seen from curve $b$, that when the heater voltage of the tubes in the buffer network only is varied (the heater voltage of the amplifier tubes remaining constant), the frequency increases as the voltage increases. A comparison of curves $a$ and $b$ of Fig. 6 indicates clearly that simultaneously increasing the heater voltage of all tubes of the novel circuit of Fig. 1, produces equal and opposite variations of multivibrator frequency, thus cancelling out frequency variations due to heater voltage changes. This is demonstrated in curve $c$.

The effect of different values of multivibrator load resistance and pentode self biasing resistance of Fig. 1 is shown in Fig. 12 which illustrates for several values of resistance which may be employed, the varying degrees of linearity of frequency change obtained thereby. From curve $a$ of Fig. 12, optimum values of $R_0 = 0.022$ megohm and $R_{CF} = 0.0015$ megohm are ascertained. Referring to Fig. 1, the values of resistors R2 and R3, correspond to this $R_0$ value while the values of resistors R5 and R6 correspond to this $R_{CF}$ value. Referring to Fig. 6 and particularly curve $a$ thereof, variation of the heater voltage of all tubes and employment of the optimum values of $R_0$ and $R_{CF}$ are shown as producing excellent linearity over a substantial portion of the curve $c$.

Fig. 7 which illustrates one curve of Fig. 9 at an enlarged scale, indicates the excellent frequency stabilization obtained when the plate supply voltage of the amplifier tubes and of the screen grid voltage of the pentodes vary simultaneously.

Referring to the diagram of Fig. 8 which illustrates the D. C. power supply employed, it will be clear just how the various multivibrator voltages were controllably varied as the single variable D. C. power supply, Es was varied. Because of the use of batteries in conjunction with the variable D. C. power supply in order to obtain voltages higher than the maximum output voltage of this supply, it is evident that a one-volt change in the voltage Es of the variable supply will cause a one-volt change in the plate supply $E_{CF}$ of the buffer network, a one volt change in the plate supply $E_0$ of the amplifier tubes, and a change in the screen grid voltage $E_{SCR}$ of the buffer network of something less than one volt because of the use of a potentiometer in obtaining this voltage.

Thus, as the variable source Es is varied, the two compensating voltages $E_0$ and $E_{SCR}$ vary in absolute value in such a manner that their ratio, as well as their difference, varies too but the rate of change of $E_{SCR}$ with respect to $E_0$ is constant.

An analysis of Fig. 9 in which multivibrator plate voltage as the abscissa is plotted against frequency as the ordinate indicates that excellent frequency stability exists while $E_0$ is varied from 225 to 235 volts, $E_{SCR}$ concurrently varying from any initial value between 122 and 144 volts, at a rate such that $E_{SCR}$ increases 0.8 volt for every 1 volt increase in $E_0$, as computed from Fig. 10.

That the rate of change of $E_{SCR}$ with respect to $E_0$, as well as the range of the initial values of $E_{SCR}$ is important, is shown by Fig. 11. Curve $a$, of Fig. 11, indicates that if $E_{SCR}$ varies at a rate of 0.8 volt per volt change in $E_0$ as was found desirable in Fig. 10 but has an initial value of 187.5 volts (as contrasted to the initial values in Fig. 9) the frequency stability is poor when $E_0$ again varies from 225 to 235 volts. Hence the range of initial values, of $E_{SCR}$, is undoubtedly important when the rate of change of $E_{SCR}$ with respect to $E_0$ is fixed. Curve $b$ of Fig. 11, demonstrates that when $E_{SCR}$ has an initial value of 140.5 volts (which falls within the desired initial values of Fig. 9) but varies at a rate of 0.6 volt per volt change in $E_0$, which is not the ratio found desirable as in Fig. 10, then the frequency stability is poor when $E_0$ again varies from 225 to 235 volts thus demonstrating that the rate of change is important. Curve $c$ of Fig. 11, was plotted with the initial value of $E_{SCR}$ below the range set by Fig. 9 and with the rate of change of $E_{SCR}$ with respect to $E_0$ considerably less than the desirable value computed from Fig. 10. Here again the frequency stability is shown to be very poor. Thus from a study of Figs. 9 and 10, the desirable range of values of $E_0$, the desirable rate of change of $E_{SCR}$ with respect to $E_0$ and the initial values of $E_{SCR}$ for optimum frequency stability are quickly determined while Fig. 11 illustrates the deleterious results of operating outside the range of optimum values as ascertained from Figs. 9 and 10. Thus there are disclosed, a set of desirable values to be employed, but there is also clearly disclosed, the deleterious effect of deviating from a desirable set of values.

All of the data in Figs. 7, 9 and 11 was taken with the same values of multivibrator load resistor and pentode self-biasing resistor. The highly desirable frequency stabilization obtained under these conditions, is shown by curve $a$ of Fig. 12 illustrating, as stated above, optimum values of Ro and Rcf. Curves $b$ and $c$ of Fig. 12 on the other hand serve as warnings that the frequency stability found to be present under observed conditions of Fig. 9, can be lost by varying either of these resistors. As seen from curve $b$ of Fig. 12, by proper choice of resistance values, a rising frequency characteristic can be obtained. As is seen from the curves of Fig. 11, by proper choice of voltages a falling frequency characteristic is obtained. It was discovered that with certain values of initial value of $E_{scr}$ and with a certain rate of change of $E_{scr}$ with respect to $E_o$, a falling characteristic, equal and opposite to a rising characteristic can be obtained for one set of values. Frequency stability can also be obtained by opposing the effect of resistance changes (Fig. 12 curve $b$) to the effect of $E_{scr}$ and $E_o$ changes (Fig. 11).

For the purposes of comparison, the circuit shown in Fig. 13, which is a simplification of the circuit of Fig. 1, will now be discussed.

The circuit of Fig. 13 is generally that of Fig. 1 except that the pentodes serving as cathode resistors are replaced by ordinary resistors, such as resistors R7 and R8 of 0.1 megohm each in the cathode circuits of V3 and V4, respectively.

The frequency characteristics of this circuit are illustrated in Figs. 14 and 15. Curve $a$ of Fig. 14 in which the cathode follower plate voltage, as the abscissa, is plotted against the multivibrator frequency, as the ordinate shows that the value of the cathode follower plate voltage does not appreciably affect the frequency of oscillation of the multivibrator, as long as the cathode follower draws no grid current.

Curve $b$ of Fig. 14 on the other hand, in which the multivibrator plate voltage, as the abscissa, is plotted against the multivibrator frequency, as the ordinate, shows that the frequency varies considerably, as the multivibrator plate voltage is varied, just as in the conventional multivibrator. Thus it becomes strikingly evident that without the employment of pentodes as cathode resistors, no means are available to be used in compensating for the variation in frequency due to the fluctuations of the multivibrator plate voltage.

Referring to Fig. 15, curve $a$ illustrates the cathode follower heater voltage, as the abscissa, plotted against the multivibrator frequency and curve $b$ the multivibrator heater voltage plotted against the frequency. In both of these, it is seen that the frequency decreases, as the heater voltage increases. Thus, when compared with curves $a$ and $b$ of Fig. 6, it is seen that one does not offset the other and therefore no curve similar to curve $c$ of Fig. 6 can be obtained. This is obvious when curve $c$ of Fig. 15 is compared to curve $c$ of Fig. 6. Therefore, the device of Fig. 13 does not produce the greatly improved results of the device of Fig. 1, in which pentodes in the cathode circuits of the cathode followers are employed to inherently introduce compensation for the variation of frequency and the greatly simplified device of Fig. 13, while it produces some improvement in frequency stability does not produce the greatly improved stability of the device of Fig. 1.

Referring to Fig. 16, there are shown a pair of pentodes V7 and V8 of the 6SJ7 type substituted for the 6SN7 triodes V3 and V4 of Fig. 1. Observations of the variations in frequency indicate that this device of Fig. 16 possessed better frequency stability than the conventional multivibrator but not as good as that of the main embodiment of Fig. 1.

While specific values of components have been employed throughout the specification and specific types of tubes have been referred to, it is to be specifically understood that such are for purposes of clarification and simplicity of illustration only and it is obvious, that these values and tube types may be changed as long as the teachings of the invention are followed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A multivibrator circuit comprising a pair of electron discharge devices each having a cathode, a plate and a control electrode, means connecting the plate of each device to the grid of the other device respectively and rendering each of said devices alternately conducting and non-conducting, a source of operating potential supplying said devices, a buffer network interposed between said plate of each device and said grid of the other device, respectively, said network comprising a cathode follower in which a third electron discharge device having a plurality of grids serves as the cathode resistor, and a source of operating potential common to said first mentioned source feeding said network whereby a variation of the plate voltage of said devices is inherently compensated for by a variation in the potential of one of said grids of said third discharge device thus resulting in a highly stabilized multivibrator.

2. An oscillator comprising a two stage amplifier, the output of each stage controlling the input to the other stage, a buffer network between the output of each stage and the input to the other stage and capacitively coupled to said respective inputs, said network comprising a cathode follower tube circuit conductively connected to said respective output, said cathode follower tube circuit having an electron discharge device serving as a cathode resistor.

3. A multivibrator comprising a pair of electron discharge tubes, the output of each tube controlling the input of the other tube, an isolation network connection between the output of each tube and the input of the other tube, respectively, said network comprising a conductively connected cathode follower tube circuit, each of said cathode follower circuits comprising a second pair of electron discharge tubes, one of said second pair comprising a screen grid device and connected as a variable cathode resistor, a common source of potential supplying said first pair of tubes and said screen grid whereby fluctuations in the frequency of said multivibrator are eliminated.

4. A multivibrator comprising a pair of electron discharge tubes, means comprising a pair of cathode followers for cross coupling said pair of tubes and a self biasing pentode comprising the cathode resistor of each of said cathode followers.

5. A multivibrator comprising a two-stage amplifier in which the output of each stage controls the input to the other, a buffer network between each output and input and including an RC coupling arrangement in the input circuit for each stage so that the signal to each input is determined by the charge and discharge current of its associated condenser, the discharge current path of each condenser comprising a vacuum tube and a resistor.

ARTHUR H. DICKINSON.

REFERENCES CITED

The following references are of record in the file of this patent:

UNITED STATES PATENTS

| Number | Name | Date |
|---|---|---|
| 2,301,928 | Brown | Nov. 17, 1942 |
| 2,416,292 | Dodington | Feb. 25, 1947 |
| 2,418,826 | Engstrom | Apr. 15, 1947 |
| 2,441,579 | Kenyon | May 18, 1948 |
| 2,454,815 | Levy | Nov. 30, 1948 |

FOREIGN PATENTS

| Number | Country | Date |
|---|---|---|
| 587,940 | Great Britain | May 9, 1947 |